H. L. COLE.
TELESCOPE LEVEL.
APPLICATION FILED OCT. 18, 1911.

1,032,379.

Patented July 16, 1912.

Witnesses
E. J. Stank
H. E. Chase

Inventor
H. L. Cole
By Howard P. Denison
Attorney

UNITED STATES PATENT OFFICE.

HENRY LUTHER COLE, OF BUFFALO, NEW YORK.

TELESCOPE-LEVEL.

1,032,379.  Specification of Letters Patent.  Patented July 16, 1912.

Application filed October 18, 1911. Serial No. 655,295.

*To all whom it may concern:*

Be it known that I, HENRY L. COLE, of Buffalo, in the county of Erie, in the State of New York, have invented new and useful Improvements in Telescope-Levels, of which the following, taken in connection with the accompanying drawings, is a full, clear, and exact description.

This invention relates to certain improvements in telescope levels and while it is particularly useful in connection with gun telescopes, it is equally applicable to any other telescope requiring a transverse level.

The main object is to incorporate this level in the telescope near the eye-piece and preferably in line with the diaphragm beneath the focal axis or line of sight so that the bubble may be visible in the telescopic vision of the object or image to which the telescope is directed, thereby enabling the user to properly adjust or level up the gun or other instrument to which the telescope is attached while sighting. In other words I have sought to avoid the use of a separate level by introducing the level or bulb into the case of the telescope in such manner that the position of the bubble may be readily seen and more or less magnified in the vision through the telescopic instrument, thus permitting the telescope or instrument to which it is attached to be accurately leveled up until the bubble is in exact central registration with the vertical cross wire without removing the eye from the eye-piece.

Other objects and uses relating to specific parts of the device will be brought out in the following description.

Figure 1:
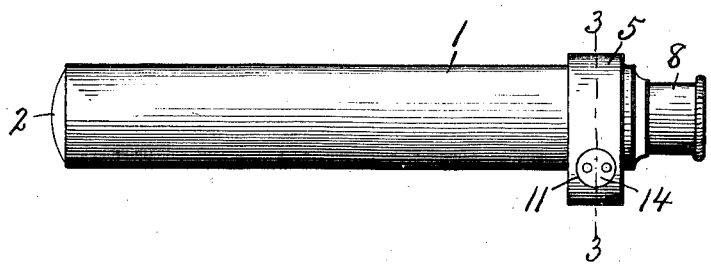
Figure 2:
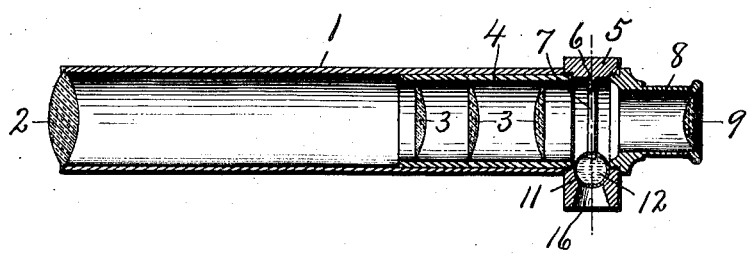
Figure 3:
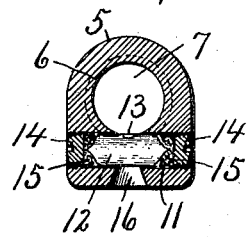
Figure 4:
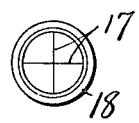
Figure 5:
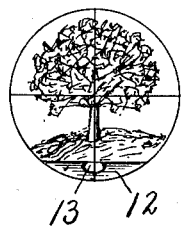

In the drawings—Figure 1 is a side elevation of a telescope embodying the various features of my invention. Fig. 2 is a longitudinal sectional view of the same telescope. Fig. 3 is a transverse sectional view taken on line 3—3, Fig. 1. Fig. 4 is an end view of the cross wire and its supporting member. Fig. 5 represents an image as viewed through the telescope, showing the level in the range of vision.

As previously stated, the level may be incorporated in any telescope and for simplicity of illustration, I have shown a telescopic tube or cylindrical casing —1— containing a plurality of lenses —2— and —3—, the lenses —3— being supported in a separate tube —4— which is secured within one end of the outer casing —1—. A diaphragm section —5— is screwed to the adjacent end of the inner tube —4— and is provided with a diaphragm —6— having a central sight opening or aperture —7— coaxial with the axis of the tube or casing —1— and lenses —2— and —3—. A sight tube —8— is secured in the front end of the diaphragm section —5— and is provided in its front end with a suitable lens —9—. The diaphragm section —5— is therefore interposed between the sight lenses —9— and next adjacent lens —3— and is provided in its base with a transverse bore or opening —11—having its upper side intersecting the lower side of the opening —7— in the diaphragm and is adapted to receive a cylindrical glass bulb —12— containing suitable liquid for forming a bubble —13—. This bulb is elongated but of less length than the transverse width of the diaphragm section —5— in which it is mounted, the ends of the bulb being preferably pointed as shown in Fig. 3 to enable it to be more accurately centered and held in operative position against endwise movement.

The opening —11— in which the bulb is mounted preferably extends through the opposite sides of the diaphragm section —5— and is preferably screw-threaded at its ends for receiving screw plugs —14— and yielding buffers —15— of cork, rubber or equivalent material which are interposed between the inner ends of the plugs —14— and adjacent ends of the bulb —12— to engage and hold the bulb in operative position against endwise or lateral movement without liability of breaking or cracking the glass of which the bulb is made, it being understood that this bulb is transparent.

In order that light may be admitted to the bulb when the eye is applied to the lens —9—, I provide the lower side of the diaphragm section —5— with an opening —16— across which the bulb extends.

Suitable cross wires —17— may be mounted in a suitable supporting ring —18— and arranged in the usual manner within the telescope to determine the vertical or horizontal positions of objects which may be visible therethrough when the telescope or instrument to which it is attached is leveled up so that the bulb —13— is in exact visual coincidence with the vertical cross wires.

The bulb is of just sufficient diameter to slide easily within the opening —11— and may be inserted or removed therefrom from either side by removing one or the other of the plugs —14— which may be accomplished by the use of a suitable key or turning device, not necessary to herein illustrate or describe.

It is now clear that when the level or bulb —12— is placed in operative position, its upper portion is exposed in the lower side of the diaphragm opening —7— and comes within the range of vision when looking through the telescope, thereby permitting the user to maintain the level of the instrument without losing sight of the image or object upon which the telescope is directed.

What I claim is:

1. In combination with a telescope having a diaphragm and sight opening therethrough, a level bulb mounted in the telescope and having a portion thereof intersecting the opening in the diaphragm so as to come within the range of vision when looking through the telescope.

2. In combination with a telescope casing having a transverse opening through one side communicating with the interior of the casing, and a level bulb mounted in said opening and also having a portion thereof exposed to the interior of the casing.

3. In combination with a telescope having a transverse opening through its lower side communicating with the interior of the telescope, and a level bulb mounted in said opening and having its upper side exposed to the interior of the telescope so as to come within the range of vision thereto.

4. In combination with a telescope having a transverse opening through its lower side communicating with the interior thereof, and an elongated level bulb mounted in said opening.

5. A telescope having a diaphragm section provided with a sight opening therethrough and a transverse opening in the base thereof communicating with the sight opening, a level bulb arranged within the opening and having its upper side exposed to the interior of the telescope, and removable means for holding the bulb in operative position.

6. A telescope having an eye-piece and an opening in its lower side at the rear of the eye-piece, a level bulb in the opening and having its upper side communicating with the interior of the telescope.

In witness whereof I have hereunto set my hand on this 23rd day of September 1911.

HENRY LUTHER COLE.

Witnesses:
ALICE GOERTZ,
ALBERT H. CLARK.